United States Patent
Monreal et al.

(10) Patent No.: US 10,016,895 B2
(45) Date of Patent: Jul. 10, 2018

(54) METHOD AND SYSTEM FOR OPERATING AND/OR MONITORING A MULTI-AXIS MACHINE

(71) Applicant: KUKA Roboter GmbH, Augsburg (DE)

(72) Inventors: Karsten Monreal, Stadtbergen (DE); Carsten Angeli, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 84 days.

(21) Appl. No.: 15/009,957

(22) Filed: Jan. 29, 2016

(65) Prior Publication Data
US 2016/0221192 A1    Aug. 4, 2016

(30) Foreign Application Priority Data

Jan. 30, 2015   (DE) .................. 10 2015 001 203

(51) Int. Cl.
*B25J 9/16*    (2006.01)
*G01L 5/28*    (2006.01)
(Continued)

(52) U.S. Cl.
CPC ............ *B25J 9/1674* (2013.01); *B25J 19/02* (2013.01); *F16D 66/00* (2013.01); *G01L 5/28* (2013.01); *G05B 2219/39097* (2013.01)

(58) Field of Classification Search
CPC ...... B25J 9/1674; B25J 19/02; B25J 19/0004; G01L 5/28; G05B 2219/39097;
(Continued)

(56) References Cited

U.S. PATENT DOCUMENTS

| 6,754,568 B1 * | 6/2004 | Ripley | G01L 5/28 340/453 |
| 2003/0076066 A1 * | 4/2003 | Iwashita | G05B 19/406 318/638 |

(Continued)

FOREIGN PATENT DOCUMENTS

| DE | 19854011 A1 | 5/2000 |
| DE | 10361132 A1 | 1/2005 |

(Continued)

OTHER PUBLICATIONS

EP2108933 English translation (original German document was provided by Applicant in IDS).*

(Continued)

*Primary Examiner* — Abby Yee Lin
(74) *Attorney, Agent, or Firm* — Wood Herron & Evans LLP

(57) ABSTRACT

A method for determining a response time of a brake of at least one assigned axis of a multi-axis machine includes actuating the axis, switching the brake, and determining a response time between a switching point in time and a response point in time at which a motion state of the axis changes. The method may further include opposing actuation of the axis while the brake is closed, and detecting a mechanical play between opposing maximum deflections of the axis. A method of operating or monitoring a multi-axis machine includes determining a response time and/or detecting mechanical play, and operating the machine or triggering a fault response based on the response time or mechanical play.

11 Claims, 1 Drawing Sheet

(51) Int. Cl.
*F16D 66/00* (2006.01)
*B25J 19/02* (2006.01)

(58) Field of Classification Search
CPC ........... G05B 2219/40151; G05B 2219/40147; F16D 66/00; B60T 17/22
See application file for complete search history.

(56) References Cited

U.S. PATENT DOCUMENTS

| | | | |
|---|---|---|---|
| 2009/0216372 A1* | 8/2009 | Watanabe | B25J 9/1674 700/245 |
| 2015/0117466 A1* | 4/2015 | Summer | B25J 9/1689 370/465 |

FOREIGN PATENT DOCUMENTS

| | | |
|---|---|---|
| DE | 102007037077 A1 | 2/2009 |
| DE | 102012003479 A1 | 8/2013 |
| EP | 1631423 A1 | 3/2006 |
| EP | 2108933 A2 | 10/2009 |
| JP | 2009274188 A | 11/2009 |
| WO | 2010025944 A1 | 3/2010 |

OTHER PUBLICATIONS

European Patent Office; Partial Search Report in European Patent Application No. 15003447.8 dated Jun. 22, 2016; 6 pages.

\* cited by examiner

METHOD AND SYSTEM FOR OPERATING AND/OR MONITORING A MULTI-AXIS MACHINE

TECHNICAL FIELD

The present invention relates to a method for determining a response time and/or the mechanical play of a brake of an axis on a multi-axis machine, in particular on a robot, a method to operate and/or monitor the machine by taking into account this response time and/or the mechanical play, and a system and computer programming product to execute a method described herein.

BACKGROUND

Brakes on axes of multi-axis machines, in particular such as robots, have a response time and/or closing time between a switching of the brake and a response point in time at which the brake changes a motion state of the assigned axis and/or effects a change of the motion state. A motion state can in particular comprise a rotational speed, a change in rotational speed, a velocity or an acceleration, and/or a deceleration of the axis. A change in velocity and/or a change in rotational speed as defined by a change and/or switch of the motion state can for instance be defined by a relative change of the reference parameter rotational speed and/or velocity by more than approximately 2 percent, by more than approximately 5 percent, especially preferred by more than approximately 10 percent, and in particular by more than approximately 20 percent. In order to effect a specified acceleration and/or deceleration, the brake needs to apply a certain minimum brake force to thereby change the motion state. In particular, the brake can also brake with a (maximum) nominal brake force. Analogously, the brakes have an opening time between a switching of the brake and a response point in time, from which point forward the brake applies, or can apply, no more than only a certain maximum brake force, and in particular is fully vented and/or at least essentially applies, and/or can apply, no further brake force.

For purposes of a more compact description, such a closing and/or opening time is generally referred to herein as the response time of the brake. The response time of the brake can in particular depend on mechanical, hydraulic, pneumatic, (electro-) magnetic and/or signaling technology and/or energy-technical inertia, brake wear, and the like.

Closed brakes also exhibit a mechanical play, by which the axis can be moved by a certain force, in particular in the amount of the (maximum) nominal brake force. In particular, such a mechanical play can also depend on brake wear.

Having knowledge of a real-time response time and/or such a mechanical play can advantageously improve the operation and/or monitoring of the machine. For instance, if the real-time response time is known, the brake can be switched appropriately earlier or later, instead of having to do so on the basis of theoretical maximum and/or worst-case values for track planning purposes. In the same manner, a known real-time mechanical play can for instance be taken into account for track planning purposes by appropriately readjusting the axis.

If a known real-time response time and/or a known real-time mechanical play exceeds a specified limit value, a fault state can be identified on the machine monitored in this manner.

The task of the present invention is therefore to improve the operation and/or monitoring of a multi-axis machine, in particular a robot.

SUMMARY

According to first aspect of the present invention, a method to determine a response time of a brake on an axis of a multi-axis machine, in particular a robot, comprises the steps:
a) actuating the axis;
b) switching the brake; and
c) determining a response time between a switching point in time of the brake and a response point in time at which the motion state of the axis changes.

In one implementation, this involves switching the brake and determining the response point in time while the axis is in the process of being actuated and/or is in the actuated state. The actuation of the brake is preferably stopped thereafter with a predetermined time offset or to detect the response point in time. In particular, the axis can be actuated by the drive with a constant velocity until it was detected that the brake has engaged and/or that the response point in time has been reached. This detection can for instance be accomplished with force-moment sensors, which measure the forces and/or moments applied between the drive and the axis. Alternatively, or additionally, the detection can also be accomplished on the basis of the current draw by the drive.

In one implementation, the response time can in particular be a closing time of the brake. In one implementation, the brake is then switched in step b) from an opened to a closed state. The response point in time can for instance be a point in time at which a predetermined rotational speed change can be detected. In particular, the response point in time can be defined as the time at which the rotational speed of the axis is reduced by more than approximately 1 percent, preferably by more than approximately 5 percent, and particularly preferred by more than approximately 10 percent relative to the rotational speed at the switching point in time.

Alternatively, the response point in time can also be defined as the time at which the axis stops, in particular when its velocity drops below a specified maximum value, preferably approaching zero.

Other criteria can be employed to detect the response point in time, in particular on the condition that the axis experiences an unaccelerated motion at the switching point in time, e.g. the velocity of the axis is constant, that the moment applied by the drive on the axis is constant and the acceleration of the axis is equal to zero.

The response point in time can for instance be a point in time at which a specified velocity change can be detected. In particular, the response point in time can be defined as the time at which the velocity of the axis is reduced by more than approximately 1 percent, preferably by more than approximately 5 percent, and particularly preferred by more than approximately 10 percent relative to the rotational speed at the switching point in time or relative to a maximum velocity of the axis.

The response point in time can for instance also be a point in time at which a specified acceleration can be detected. In particular, the response point in time can be defined as the time at which the acceleration value of the axis is more than approximately 1 percent, preferably more than approximately 5 percent, and particularly preferred more than approximately 10 percent relative to a maximum acceleration capacity or an average acceleration capacity of the drive.

The response point in time can for instance also be a point in time at which a specified moment change between the drive and axis can be detected. In particular, the response point in time can be defined as the time at which the moment value is more than approximately 1 percent, preferably more than approximately 5 percent, and particularly preferred more than approximately 10 percent relative to a maximum exertable moment or an average exertable moment.

Preferably, a combination of two or more of the above criteria can also be employed to detect the response point in time.

In another implementation, the response time can in particular be an opening time of the brake. In this case, in one implementation, the brake is switched in step b) from a closed to an opened state, wherein the response point in time is then a point in time at which the motion state of the axis changes, that is to say e.g. the axis begins to move, in particular its velocity exceeding a specified minimum value, preferably differing from zero, or the axis rotating by at least a specified angle, for instance by at least approximately 1 degree, preferably by at least approximately 5 degrees.

Both implementations can be combined with each other, where in one implementation initially the brake in a first step b) switches from an opened to a closed state and determines a response time and/or closing time, and subsequently, after possibly determining a mechanical play in accordance with a subsequently explained second aspect of the present invention, the brake in a second step b) switches from a closed to an opened state, and an opening time is determined. Conversely, the brake can initially in a first step b) be switched from a closed to an opened state, and an opening time can be determined, and the brake subsequently in a second step b) can be switched from an opened to a closed state, and a response time and/or closing time can be determined.

In one implementation, a change is detected of the motion state of the axis and/or the response point in time, in particular a stopping and/or dropping below a specified maximum velocity value and/or a start of motion and/or exceeding a specified minimum velocity value, in particular by means of a position detection device, in particular by detecting at what point in time a position and/or location, in particular an angular position and orientation of the axis determined by the position detection device changes and/or no longer changes. Additionally or alternatively, in one implementation, a change of the motion state of the axis and/or the response point in time is detected by means of a motion state detection device, for instance a velocity detection device, an acceleration detection device and/or a moment detection device, in particular by detecting at what point in time a velocity, in particular rotational speed, of the axis detected by the velocity detection device exceeds a specified maximum value and/or drops below a specified minimum value, preferably becoming equal to and/or unequal to zero. Additionally or alternatively, in one implementation, a change of the motion state of the axis and/or the response point in time is detected by means of an acceleration detection device, in particular by detecting at what point in time an acceleration, in particular an angular acceleration, of the axis detected by the acceleration detection device changes and/or no longer changes. For instance, a response point in time at which the motion state of the axis changes, that is to say e.g. the axis begins to move, can be detected by an acceleration different from zero. The motion state detection device can for instance be configured as a moment sensor, which is preferably arranged in the articulated joint between two links of the machine that swivel relative to each other. Alternatively or additionally, the motion state can be detected by measuring the current draw of a drive that actuates the axis.

In one implementation, the switching point in time is a point in time at which a switching of the brake is triggered or detected, in particular by means of signaling technology and/or energy technology. Accordingly, in one implementation, the switching point in time is a point in time at which a switching of the brake is commanded by signaling technology and/or a signal to switch the brake is issued or received. In another implementation, the switching point in time is a point in time at which a switching of the brake is triggered by energy technology and/or an energy supply for the brake is disconnected or connected and/or such a disconnection and/or connection is detected, in particular by means of a sensor.

In accordance with a second aspect of the present invention, a method to determine a mechanical play of a brake on at least one assigned axis of a multi-axis machine, in particular a robot or a machine tool, comprises the steps:

i) opposing actuation of the axis while the brake is closed; and j) detection of a mechanical play between opposing maximum deflections of the axis.

In one implementation, this involves detecting the mechanical play while the axis is being actuated and/or is in the actuated state in an opposing manner. Preferably, the actuation of the axis can be stopped when the brake response was detected.

In one implementation, the steps i), j) are repeated one or several times and/or the axis is actuated several times in an opposing manner while the brake is closed and a (total-) mechanical play is determined from individual mechanical plays detected during this process between the opposing maximum deflections of the axis. The (total-)mechanical play can in particular be a maximum, minimum, or average of the individual mechanical plays. In this manner, the precision and/or accuracy of the determined mechanical plays can be advantageously improved.

As already discussed above, the first and second aspects are or can be combined with each other in one implementation, in particular by initially closing the brake while the axis is in an actuated state and determining a response time and/or a closing time, and subsequently actuating the axis one or several times in an opposing manner while the brake is (continues to be) in a closed state and determining a mechanical play, and subsequently opening the closed brake with the axis in an actuated state and determining an opening time. In the same manner, only the first or only the second aspect can also be implemented in one implementation. Accordingly, the aforementioned and subsequent explanations relate to the first as well as the second aspect.

In one implementation, the axis is actuated by a motor, in particular in an opposing manner and/or in the opposite directions and/or at least in a time period between a switching point in time at which the brake is switched, and the response time period at which the motion state of the axis changes.

In one implementation, the axis is actuated with a specified force and/or the motor applies a specified force on the axis; for purposes of a more compact description, an antiparallel force couple and/or torque is also generalized as a force herein.

A response time and/or a mechanical play can generally be determined in a force-specific manner. As discussed in the beginning, a response time and/or closing time can be a time between a switching of the brake and a response point in time from which point forward the brake causes a change and/or a switch of the motion state of the axis. This can for instance be effected by the brake applying, and/or having the ability to apply, a certain a minimum brake force, in particular a (maximum) nominal brake force. Analogously, an opening time can be a time between a switching of the brake and a response point in time, from which point forward the brake applies, or can apply, no more than only a certain maximum brake force, and in particular is fully vented and/or at least essentially applies, and/or can apply, no further brake force. Accordingly, a mechanical play can be the play by which the axis is moved and/or can be moved by a certain force, in particular in the amount of the (maximum) nominal force.

In one implementation, this force is specified as a function of friction and/or weight forces, since friction and/or weight forces—that in total can counteract the brake and/or support the brake—can be applied on the axis in addition to the force applied by the motor. As a result, in one implementation, a response time and/or a mechanical play can be advantageously determined in a total force-specific manner, wherein the total force and/or the sum of the forces applied on the axis can comprise the applied friction, weight, and motor forces. In particular, the motor force used to actuate the axis and/or applied to the axis can be increased by a friction and/or weight force counteracting this actuation and/or can be reduced by a weight force supporting this actuation.

In particular when the axis is at rest, the force that needs to be generated to achieve a position change of the axis depends on the friction $F_{Friction}$, which is directed approximately equally in both directions and gravity $F_{Gravity}$, which is directed directionally dependent. The brake can apply a certain minimum brake force $F_{Brake}$ in both directions. The two maximum forces that need to be applied to detect a play and/or a position difference can therefore be selected in one implementation for $$F_1 = F_{Gravity} - (F_{Friction} + F_{Brake}) \text{ and}$$

$$F_2 = F_{Gravity} + (F_{Friction} + F_{Brake}).$$

The difference of the respectively resulting position of the axis when forces $F_1$ and $F_2$ are applied can define the play.

In particular a weight force, within a certain scope also a friction force, depends on the position of the axes of the machine. Accordingly, the force applied by a motor to actuate the axis is specified in one implementation depending on the machine position.

The force and/or weight force dependency can be determined in one implementation based on a model or on the basis of a preceding actuation.

The motor force used to actuate the axis and/or applied to the axis is specified in one implementation on the basis of an in particular maximum nominal force of the brake. As already discussed, a response time and/or a mechanical play can be determined in a force-specific manner. By specifying the force on the basis of an in particular maximum nominal force of the brake, a nominal load of the brake can be detected advantageously, in particular a response time and/or closing time can be determined until the brake applies, or can apply, its nominal force, or a mechanical play at the maximum nominal load of the brake can be determined. The force specified in one implementation only represents a portion of an in particular maximum nominal force of a brake, for instance 10 percent, 50 percent, or 75 percent. This for instance allows an opening time to be determined in one implementation from which point forward the brake no longer applies, and/or can apply, this portion, e.g. the axis begins to move.

Additionally or alternatively, the axis in one implementation is actuated by a motor with the specified velocity, in particular a rotational speed. In particular, in one implementation, a velocity can be specified, and the axis can be actuated in a velocity-controlled manner and/or the motor force actuating the axis can be specified in a velocity-controlled manner, wherein this force can then be limited in one implementation to a specified value, in particular a (maximum) nominal force of the brake. This allows a response time and/or a mechanical play to be determined in a particularly easy and accurate manner.

As discussed in the beginning, having knowledge of a real-time response time and/or a real-time mechanical play in particular facilitates a monitoring of a multi-axis machine, in particular a robot, in particular as to whether one or several brakes exhibit excessively large closing and/or opening times and/or mechanical plays, in particular due to wear. Accordingly, in accordance with yet another aspect of the present invention, a real-time response time is determined for one or several brakes of the machine in accordance with a method described herein, and a fault response is triggered when the determined response time lies outside of a specified range. Additionally or alternatively, a real-time mechanical play is determined for one or several brakes of the machine in accordance with a method described herein, and a fault response is triggered when the determined mechanical play lies outside a specified range.

In one implementation, the range is specified in each case based on a response time and/or a mechanical play determined by previously executing a method described herein. This allows a change of the brake(s) to be advantageously detected, in particular recorded.

The fault response can in particular comprise the issuance of a fault message and/or a stopping of the machine, in particular a closing of the brakes(s).

As discussed in the beginning, additionally or alternatively to a monitoring—by taking into account a real-time response time and/or a real-time mechanical play on a multi-axis machine, in particular a robot, the operation of same can be improved. Accordingly, according to yet another aspect of the present invention, a real-time response time for one or several brakes of the machine is determined according to a method described herein, and the machine is operated by taking this response time into account, in particularly by planning its motion, in particular by specifying, in particular by adjusting, the points in time of opening and/or closing commands in a control program for the machine on the basis of the determined response time(s). Additionally or alternatively, a real-time mechanical play on one or several brakes of the machine is determined in accordance with a method described herein, and the machine is operated by taking this response time into account, in particular by planning its motion, in particular by specifying, in particular by adjusting, motion commands in a control program for the machine on the basis of the determined mechanical play.

In accordance with yet another aspect of the present invention, a system to operate and/or monitor a multi-axis machine, in particular a robot, is arranged based on hardware and/or software technology to execute the method described herein.

For this purpose, the system is equipped in one implementation with devices to actuate the axis, devices to switch the brake, and devices to determine a response time between a switching point in time and a response point in time at which the motion state of the axis changes.

In one implementation, the system exhibits position, velocity, or acceleration detection devices to detect a change of the motion state of the axis and/or devices to detect the switching point in time at which a switching of the brake is triggered, in particular by signaling technology and/or energy technology means.

In one implementation, the system exhibits devices to actuate the axis in an opposing manner when the brake is closed and devices to detect a mechanical play between opposing maximum deflections of the axis.

In one implementation, the system has devices to actuate the axis by motor with a specified velocity and/or a specified force; in one implementation the system has devices to specify the force as a function of friction and/or weight force, in particular as a function of the machine position, in particular based on a model or based on a preceding actuation, and/or based on an in particular maximum nominal force of the brake.

In one implementation, the system has devices to operate a multi-axis machine, in particular a robot, in consideration of the response time and/or the mechanical play, in particular to plan its motion, wherein the former is and/or are determined and/or detected by the device to determine a response time and/or the device to detect a mechanical play.

In one implementation, the system has devices to monitor a multi-axis machine, in particular a robot, based on the response time and/or the mechanical play, wherein the former is and/or are determined and/or detected by the device to determine a response time and/or the device to determine a mechanical play, and devices to trigger a fault response when the determined response time and/or the detected mechanical play lies outside of the specified range.

A means in the sense of the present invention may be embodied by way of technical hardware and/or software means, particularly a processing, particularly micro-processing unit (CPU), preferably connected via a storage and/or bus system transmitting data and/or signals, particularly digital ones, and/or show one or more programs or program modules. The CPU may be embodied such that commands are implemented to process a program saved in a storage system, record input signals from a data bus and/or issue output signals to a data bus. A storage system may comprise one or more, particularly different storage media, particularly optical, magnetic, solid matter, and/or other non-volatile media. The program may be embodied such that it represents and/or can implement the methods described here such that the CPU can execute the steps of such methods and thus can in particular operate and/or monitor the machine.

BRIEF DESCRIPTION OF THE DRAWINGS

Additional advantages and features are found in the dependent claims and the exemplary implementations, wherein, in partially schematic views:

DETAILED DESCRIPTION

Figure 1:
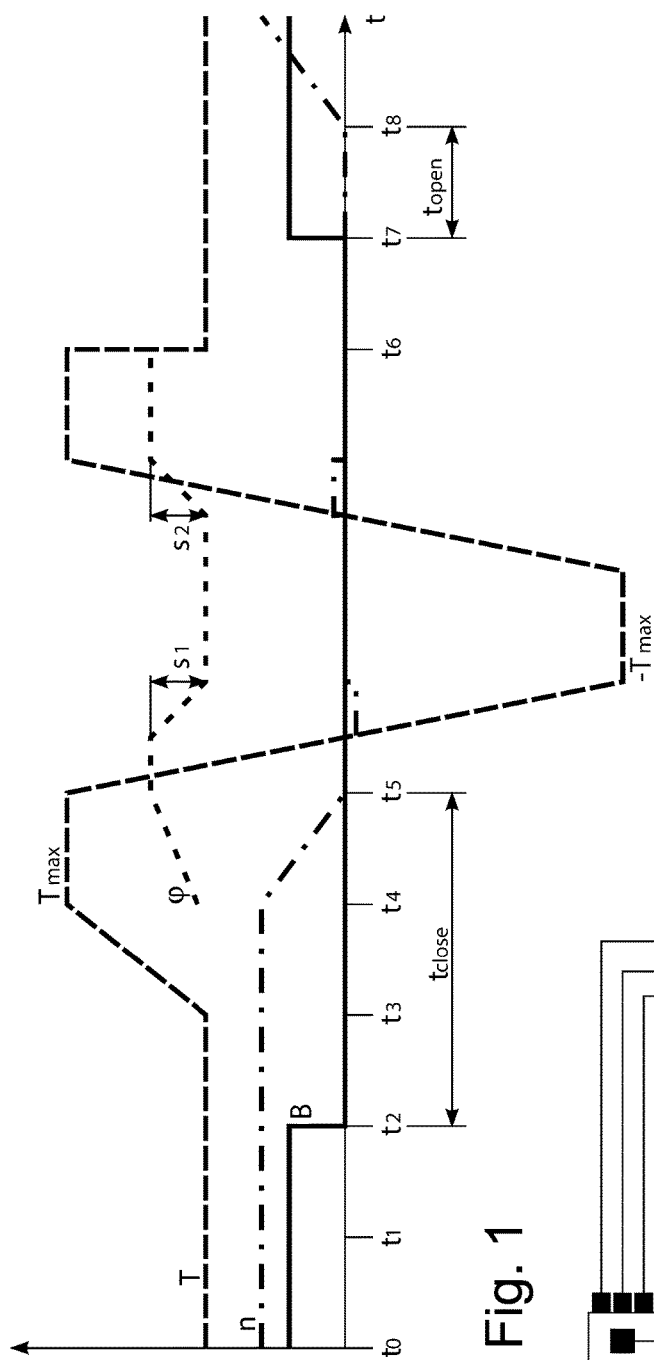
FIG. 1: shows a sequence of a method according to one implementation of the present invention.
Figure 2:
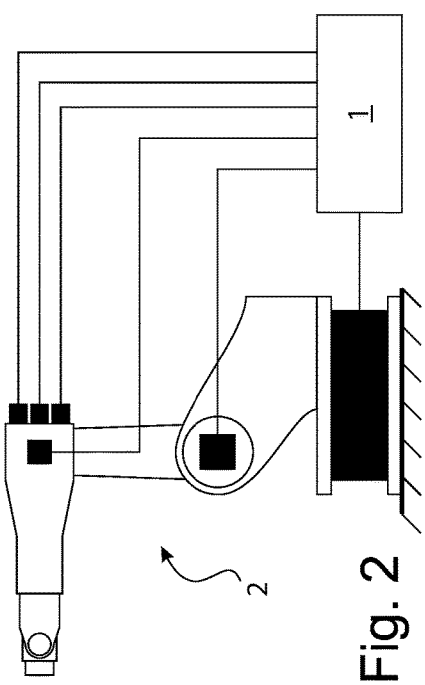
FIG. 2: shows a robot with a system to execute the method according to one implementation of the present invention.

FIG. 1 shows a sequence for a method according to one implementation of the present invention as a function of time t as the abscissa. The ordinate direction shows a solid line with a switching state B of a brake of an axis of a multi-axis robot 2 (see FIG. 2), a dashed line with a torque curve T of a drive of the axis, a dotted-dashed line with a velocity curve n of the axis, and a dotted line with a partially displayed position curve φ of the axis.

The axis is actuated without braking during a first time period [$t_0$, $t_1$]. This involves determining the weight force and friction torques in order to reduce and/or increase the drive torque T as a function of the position during the subsequent determination of the response times and mechanical play. For purposes of a more coherent representation, the weight force and friction influences are disregarded in the exemplary implementation; in particular, the exemplary implementation can refer to the first vertical axis of rotation on robot 2 for illustration purposes.

During a second time period [$t_1$, $t_5$], the axis is actuated based on a rotational speed control, wherein a drive torque is limited to a maximum nominal moment $T_{max}$ of the brake.

The brake is switched to a closed state at a point in time $t_2$. The first switching point in time $t_2$ is detected as the point in time at which this switching of the brake is triggered or detected by means of signaling and/or energy technology, for instance by issuing or receiving a corresponding closing signal, or by de-energizing an energy supply of the actively vented brake. FIG. 1 indicates this as a step in the switching state B.

At a point in time $t_3$, the brake begins to apply a braking effect on the axis. This is initially compensated by a correspondingly increasing drive torque T of the rotational speed-controlled drive until the maximum nominal torque of the brake is reached. The lag between the switching of the brake and the start of its braking effect can for instance be caused by mechanical, hydraulic, pneumatic, (electro-) magnetic, signaling, and/or energy-technology inertia and/or inductivities.

Starting at the point in time $t_4$, the brake decelerates the axis toward the drive torque limited to $T_{max}$, until the axis stops at a point in time $t_5$. This point in time $t_5$ is detected by a position or velocity sensor of the axis, and is determined as the first response point in time by the control 1 of robot 2 (see FIG. 2).

The control determines a difference between the first switching point in time $t_2$ and the first response point in time $t_5$ as the real-time response time and/or closing time $t_{close}$.

During a subsequent third time period [$t_5$, $t_6$], the drive actuates the axis in the opposite direction while the brake continues to be closed, initially with the negative maximum nominal torque $T_{max}$ of the brake and then again with the (positive) maximum nominal torque $T_{max}$.

In doing so, the position sensor of the axis detects an individual mechanical play $s_1$ and/or $s_2$ each between opposing maximum deflections φ of the axis (see FIG. 1).

The control 1 uses this information to determine the real-time (total) mechanical play of the brake, for instance by averaging the values $s_1$, $s_2$ or by selecting the larger value.

During a subsequent fourth time period [$t_6$, $t_8$], the drive actuates the axis while the brake continues to be closed with e.g. 50% of the maximum nominal torque $T_{max}$ of the brake.

The brake is switched to an open state at a point in time $t_7$. The second switching point in time $t_7$ is detected as the point in time at which this switching of the brake is triggered or detected by means of signaling and/or energy technology, for instance by issuing or receiving a corresponding opening signal, or by energizing an energy supply of the actively vented brake. FIG. 1 indicates this as an (inverse) step in the switching state B.

At the point in time $t_8$, the braking effect of the brake on the drive torque has been reduced to 0.5 $T_{max}$, the axis begins to move (n>0). This point in time $t_8$ is detected by a position or velocity sensor or an accelerometer of the axis, and is determined as the second response point in time by the control 1.

The control 1 determines a difference between the second switching point in time $t_7$ and the second response point in time $t_8$ as the real-time opening time $t_{open}$.

The control 1 then plans a motion of robot 2 by taking into account these determined real-time response times $t_{close}$, $t_{open}$ by appropriately adjusting the switching points in time for the brake in a control program.

The control 1 also monitors the robot 2 and triggers a fault response, for instance by issuing a fault message when one of the determined real-time response times or the determined mechanical play lies outside of the specified range.

The control 1 and the sensors to detect the switching points in time, the change of the motion state and mechanical plays form a system in accordance with an implementation of the present invention, which include hardware and/or software technology devices arranged to execute the method described herein.

Although exemplary implementations have been explained in the above description, it is hereby noted that a plurality of modifications is possible. In addition, it is hereby noted that the exemplary implementations are merely examples, which are not intended to in any way restrict the scope of protection, the uses, and the construction. Rather, the preceding description gives a person skilled in the art a guideline for the implementation of at least one exemplary implementation, wherein various modifications, in particular with respect to the function and arrangement of the components described, can be undertaken without departing from the scope of protection as indicated by the claims and the equivalent combinations of features.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

LIST OF REFERENCE NUMBERS

1 Control
2 Robot
T Drive torque
n Rotational speed
B Brake switching state
φ Axis position
$t_{(\ldots)}$ (Point) in time

What is claimed is:

1. A method for determining a response time of a brake of at least one assigned axis of a multi-axis machine, the method comprising:
actuating the at least one assigned axis;
switching the brake at a switching point in time, whereafter the brake is actuated from an opened state to a closed state, or from a closed state to an opened state;
wherein switching the brake includes issuing a command to move the brake from the opened state to the closed state, or from the closed state to the opened state; and
determining a response time between the switching point in time and a response point in time at which a motion state of the at least one axis changes.

2. The method of claim 1, wherein the multi-axis machine is one of a robot or a machine tool.

3. The method of claim 1, wherein the brake is switched from an opened state to a closed state, and wherein the response point in time is a point in time at which the rotational speed of the at least one assigned axis is reduced by more than approximately 1 percent relative to the rotational speed at the switching point in time, or at which the assigned axis stops.

4. The method of claim 1, wherein the brake is switched from an opened state to a closed state, and the response point in time is a point in time at which a torque of a drive that actuates the at least one axis and which is necessary to maintain the velocity of the at least one axis increases by more than approximately 1 percent.

5. The method of claim 1, wherein the brake is switched from a closed state to an opened state, and the response point in time is a point in time at which the at least one axis begins to move from rest.

6. The method of claim 1, further comprising:
detecting a change of the motion state of the at least one axis with a position, velocity, or acceleration detection device.

7. The method of claim 1, wherein the switching point in time is a point in time at which a switching of the brake is triggered or detected by at least one of a signaling device or an energy technology device.

8. A method of operating a multi-axis machine, the method comprising:
determining a response time of a brake associated with at least one assigned axis of the machine, wherein:
determining the response time comprises:
actuating the at least one assigned axis,
switching the brake at a switching point in time, whereafter the brake is actuated from an opened state to a closed state, or from a closed state to an opened state,
wherein switching the brake includes issuing a command to move the brake from the opened state to the closed state, or from the closed state to the opened state, and
determining the response time between a switching point in time and a response point in time at which a motion state of the at least one axis changes and;
operating the multi-axis machine taking into account the determined response time.

9. A method for monitoring a multi-axis machine, the method comprising:
determining a response time of a brake associated with at least one assigned axis of the machine, wherein:
determining the response time comprises:
actuating the at least one assigned axis,
switching the brake at a switching point in time, whereafter the brake is actuated from an opened state to a closed state, or from a closed state to an opened state,
wherein switching the brake includes issuing a command to move the brake from the opened state to the closed state, or from the closed state to the opened state, and determining the response time between a switching point in time and a response point in time at which a motion state of the at least one axis changes and;
triggering a fault response when the determined response time lies outside of a specified range.

10. A controller for operating or monitoring a multi-axis machine, wherein the machine includes at least one assigned axis and an associated brake, the controller having programming code stored on a non-transitory machine readable data medium, the programming code configured to, when executed by the controller, cause the controller to:
determine a response time of the brake of the at least one assigned axis of the machine, wherein:
determining the response time comprises:
actuating the at least one assigned axis,
switching the brake at a switching point in time, whereafter the brake is actuated from an opened state to a closed state, or from a closed state to an opened state,
wherein switching the brake includes issuing a command to move the brake from the opened state to the closed state, or from the closed state to the opened state, and
determining the response time between a switching point in time and a response point in time at which a motion state of the at least one axis changes and;
then take at least one of the following actions:
trigger a fault response when the determined response time lies outside of a specified range, or
operate the multi-axis machine taking into account the determined response time.

11. A computer program product for use with a multi-axis machine, wherein the machine includes at least one assigned axis and an associated brake, the computer program product having programming code stored on a non-transitory machine readable data medium, the programming code configured to, when executed by a controller, cause the controller to:
determine a response time of the brake of the at least one axis of the machine, wherein:
determining the response time comprises:
actuating the at least one assigned axis,
switching the brake at a switching point in time, whereafter the brake is actuated from an opened state to a closed state, or from a closed state to an opened state,
wherein switching the brake includes issuing a command to move the brake from the opened state to the closed state, or from the closed state to the opened state, and
determining the response time between a switching point in time and a response point in time at which a motion state of the axis changes and;
then take at least one of the following actions:
trigger a fault response when the determined response time lies outside of a specified range, or
operate the multi-axis machine taking into account the determined response time.

* * * * *